UNITED STATES PATENT OFFICE.

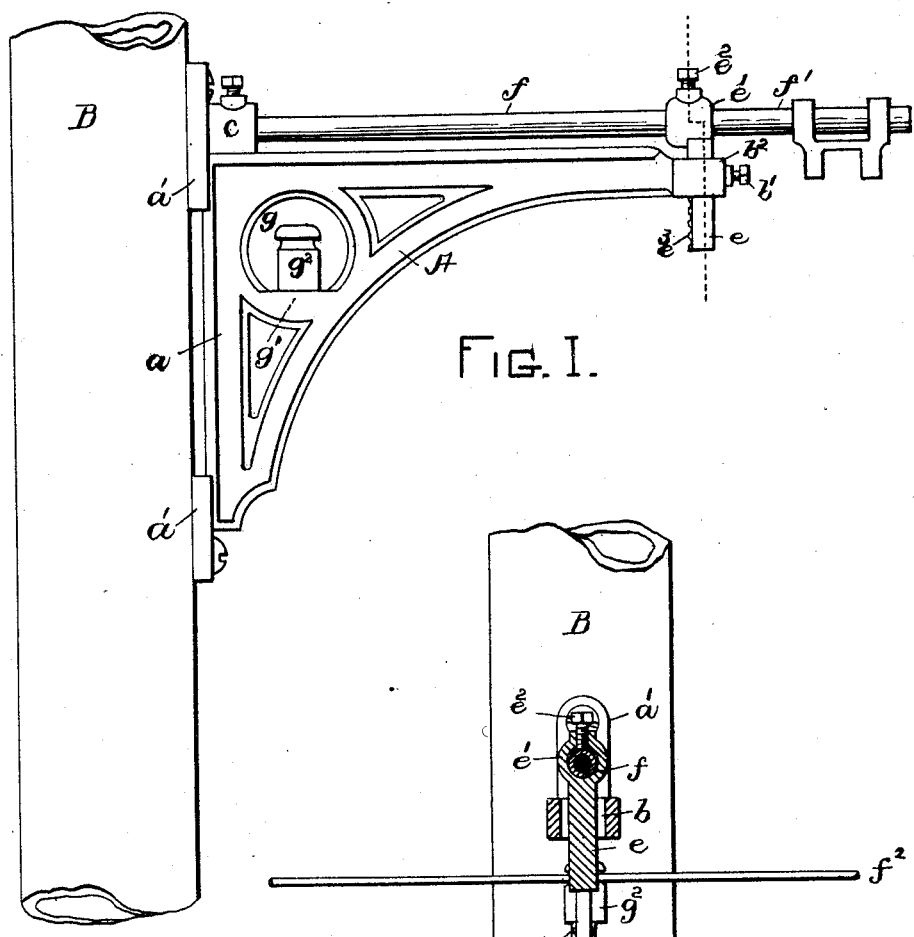

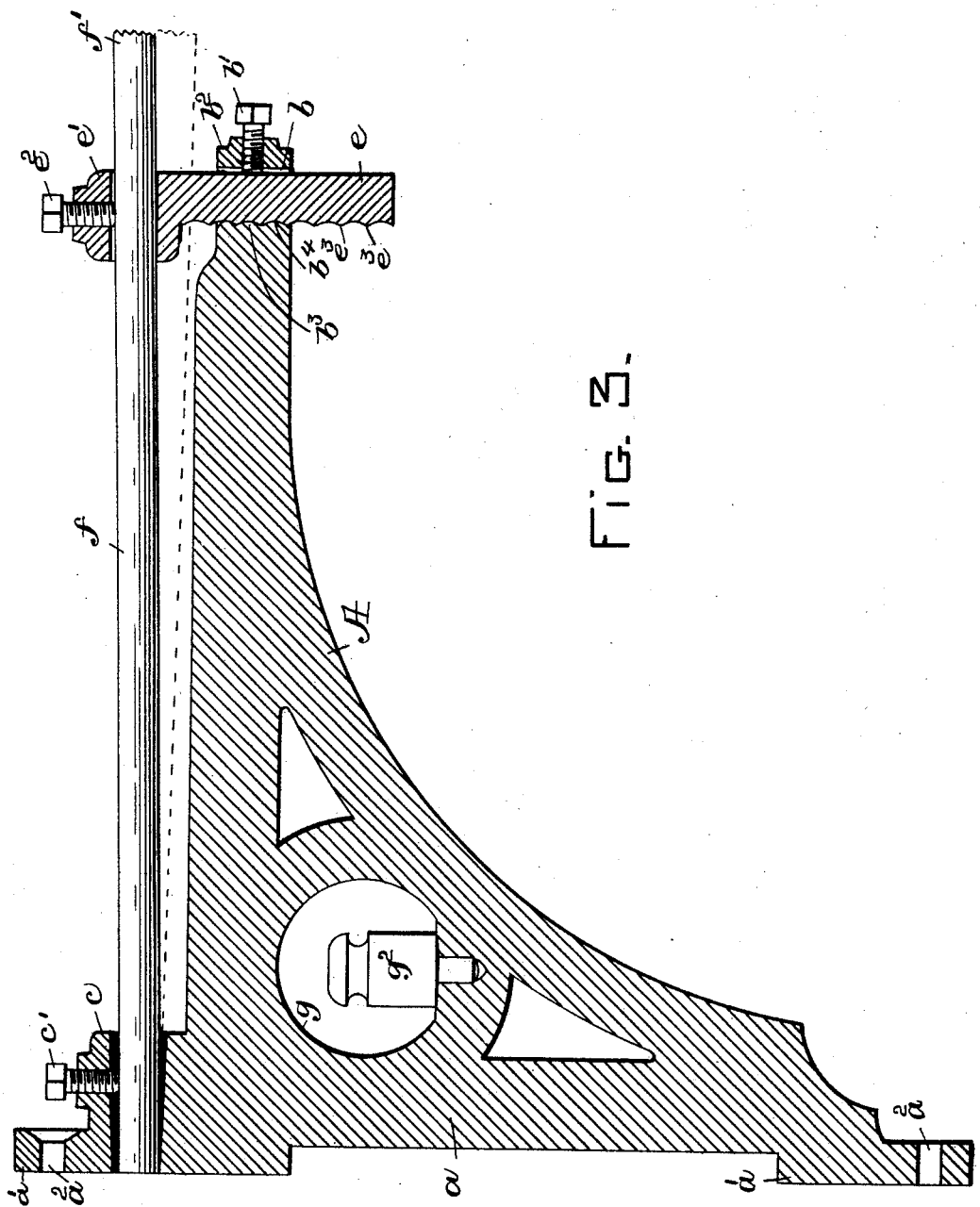

EDWARD P. RUSSELL, OF NEWBURYPORT, MASSACHUSETTS.

BRACKET FOR TROLLEY-WIRE SUPPORTS, &c.

SPECIFICATION forming part of Letters Patent No. 466,956, dated January 12, 1892.

Application filed September 11, 1891. Serial No. 405,386. (No model.)

*To all whom it may concern:*

Be it known that I, EDWARD P. RUSSELL, a citizen of the United States, residing at Newburyport, in the county of Essex and State of Massachusetts, have invented a new and useful Improvement in Brackets for Trolley-Wire Supports, &c., of which the following is a full, clear, and exact description, reference being had to the accompanying drawings, forming a part of this specification, in explaining its nature.

It is desirable that trolley-wires and similar electric conductors be supported or held by an adjustable holder or support attached or secured to a post or similar upright in a manner to permit its outer end to be adjusted or moved to any desired level, inclination, or other position for the purpose of varying the level or other position of the trolley or other wire; and my invention relates to a device for carrying this idea into effect. It is represented as embodied in the form of a cast-iron bracket or arm, which is adapted to be secured to a post or other support, and which has cast with it a horizontal socket or hole for receiving the end of a horizontal pipe or rod, located, preferably, upon the upper surface of the bracket or arm at or near its inner end, and also has at its outer end a pipe or rod holder or support, which is connected with the outer end of the bracket in a manner to permit it to be moved vertically, horizontally, or to assume any position within a limited range or distance from the end of the bracket and to be locked in such position. The wire is fastened to the outer end of the pipe or rod and the pipe or rod is secured to the socket and holder by locking screws or devices.

Referring to the drawings, Figure 1 is a view in elevation representing the bracket attached to a post. Fig. 2 is a view in section on the dotted line of Fig. 1, and in elevation of parts back of said line. Fig. 3 is a view in vertical section enlarged lengthwise the bracket.

A represents the bracket and it preferably is made in one piece of cast-iron. It has upon its vertical side $a$ the lugs $a'$, provided with screw or other holes $a^2$ for receiving the fastening screws or bolts which attach or secure it to the post B or other support. The bracket may be extended horizontally to any desired length. It has at its upper inner corner a horizontal socket $c$, preferably flaring or enlarged toward its mouth, and a locking or set screw $c'$ is arranged in the case of the socket to be screwed into it. At the outer end of the bracket-arm there is a rectangular hole $b$, formed in the act of casting the bracket, and into this hole a locking or set screw $b'$ is adapted to be screwed through the outer end $b^2$ of the bracket. This hole $b$ receives a spindle $e$, which carries at its upper end a hollow support or sleeve $e'$, through the upper end of which a set or locking screw $e^2$ extends. This support $e'$ and the socket $c$ hold a pipe or rod $f$, to the outer end $f'$ of which is secured the trolley or other wire $f^2$. The rod or pipe $f$ is fastened in the socket $c$ by the locking-screw $c'$, and in the holder $e'$ by the locking-screw $e^2$. The holder $e'$ may have any desired adjustment. A vertical adjustment alone will answer for some purposes; but for miscellaneous use it is desirable that the holder have a substantially universal adjustment in relation to the bracket end. This result I have secured by making the spindle $e$ slightly less in thickness than the width of the hole $b$, and considerably less in width than the horizontal length of the hole. This permits the spindle to be moved up and down in the hole for the purpose of vertical adjustment of the pipe or rod and wire. It also permits the spindle and holder to be moved horizontally for the purpose of providing a horizontal adjustment to the rod or pipe and wire, and it also permits the holder to be tipped or inclined and to have a slight turning movement upon its vertical axis, due to its loose fit in the hole $b$. To relieve the locking-screw, which holds it in place after it has been moved to the desired position, from undue strain, I have formed upon the edge $b^3$ of the hole $b$ a series of cross-teeth or notches $b^4$, and upon the face of the spindle $e$, which moves thereon, corresponding cross-teeth or notches $e^3$, the teeth or notches $b^4$ and $e^3$ interlocking when the spindle is forced inward toward the surface $b^3$ by the locking-screw $b'$. The bracket may also have the horizontal hole $g$ through its web, and the web may also have at the lower end of the hole a lug or enlargement $g'$, which supports an insulator $g^2$. By arranging holes $g$ in the various brackets provision is made for stringing a feed or other wire upon the line of the brackets, and thereby utilizing them to sustain the wire, and such wire is secured to the insulators carried in the holes.

It will be understood that the socket $c$ is formed integral with the bracket in casting, and that the entire bracket, with the exception of the adjustable end holder and the locking-screws, is formed in one piece by casting.

I would not be understood as confining myself to the especial mode of attaching the adjustable end support to the bracket specified, as I may use any mechanical equivalent for that described.

The advantage of the invention arises, first, from the cheapness of the construction, and, second, from the ease with which a proper level or position may be obtained for the end of the support which receives and holds the end of the wire, it being understood, of course, that in the erection of posts and their subsequent use that it is practically impossible to place or maintain posts for the support of a trolley-wire in such an absolutely vertical position that the top of a bracket attached or secured thereto will be always perfectly horizontal, and that, therefore, to provide for this variation from the perpendicular, which changes the level of the bracket, a means for placing and maintaining a support for the ends of the trolley-supporting wire, which shall be adjustable in relation to the bracket, is of very material service and advantage.

Having thus fully described my invention, I claim and desire to secure by Letters Patent of the United States—

1. As an improved article of manufacture, a cast-iron bracket adapted to be secured to a post or other support, and having at or near its inner end a wire-holding rod or pipe receiving and holding socket, and at or near its outer end an adjustable pipe or rod receiver and holder, as and for the purposes described.

2. A bracket for the purposes specified having means for attachment to a post or support, a socket $c$ and locking-screw $c'$ and provided with a hole $b$ at its outer end and a locking-screw $b'$, a rod or pipe holder $e'$, having a spindle $e$ to enter said hole, and the wire holding or supporting rod or pipe $f$, extending from the socket through the holder at the end of the bracket, substantially as described.

3. A bracket of the character specified having at its end the elongated hole $b$ and a rod or pipe holder having a spindle $e$, movable in said hole $b$, as specified, and means for locking it to the bracket, substantially as described.

4. A bracket of the character specified having at its outer end the hole $b$, the cross-teeth or notches $b^4$ in one surface of said hole, and the rod or pipe holder having the spindle $e$, with notches or recesses $e^3$, to lock with the notches or teeth $b^4$ and the locking-screw $b'$, substantially as described.

5. The combination, in a bracket for supporting a trolley or other wire, of a rod or pipe to which the wire is secured and which is carried by the bracket, and an adjustable rod or pipe-holder, as and for the purposes described.

EDWARD P. RUSSELL.

In presence of—
ASA W. EMERSON,
EDWARD F. BARTLETT.